US012499012B1

United States Patent
Werner et al.

(10) Patent No.: US 12,499,012 B1
(45) Date of Patent: Dec. 16, 2025

(54) SUSTAINABLE REDUNDANT ARRAY OF INEXPENSIVE DISKS (RAID)

(71) Applicant: INTERNATIONAL BUSINESS MACHINES CORPORATION, Armonk, NY (US)

(72) Inventors: John S. Werner, Fishkill, NY (US); Pasquale A. Catalano, Wallkill, NY (US); Arkadiy O. Tsfasman, Wappingers Falls, NY (US); Christopher V DeRobertis, Hopewell Junction, NY (US); Ryan Thomas Rawlins, Poughkeepsie, NY (US); Andrew C. M. Hicks, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 6 days.

(21) Appl. No.: 18/743,514

(22) Filed: Jun. 14, 2024

(51) Int. Cl.
  *G06F 11/00* (2006.01)
  *G06F 11/10* (2006.01)
(52) U.S. Cl.
  CPC ................. *G06F 11/1092* (2013.01)
(58) Field of Classification Search
  CPC ............ G06F 11/1076; G06F 11/1088; G06F 11/1092; G06F 1/32; G06F 1/3203; G06F 1/3221
  See application file for complete search history.

(56) References Cited

U.S. PATENT DOCUMENTS

| | | | | |
|---|---|---|---|---|
| 7,516,348 B1* | 4/2009 | Ofer | ...................... | G06F 1/3287 |
| | | | | 714/6.32 |
| 8,140,751 B1* | 3/2012 | Wang | .................... | G06F 11/008 |
| | | | | 711/170 |
| 8,583,885 B1* | 11/2013 | Natanzon | ............ | G06F 11/2074 |
| | | | | 713/324 |

(Continued)

OTHER PUBLICATIONS

Gopinath, et al., "A 3-Tier RAID Storage System with RAID1, RAID5, and Compressed RAID5 for Linux," 2000 USENIX Annual Technical Conference (USENIX ATC 00) [article], Jun. 2000, 15 pages, Retrieved from the Internet: <URL: https://www.usenix.org/conference/2000-usenix-annual-technical-conference/3-tier-raid-storage-system-raid1-raid5-and>.

Li, et al., "EERAID: energy efficient redundant and inexpensive disk array," EW 11: Proceedings of the 11th workshop on ACM SIGOPS European workshop [article], Sep. 2004, 14 pages, DOI: 10.1145/1133572.1133577, Retrieved from the Internet: <URL: https://dl.acm.org/doi/10.1145/1133572.1133577>.

(Continued)

Primary Examiner — Marc Duncan
(74) Attorney, Agent, or Firm — Teddi E. Maranzano

(57) ABSTRACT

A method, computer system, and a computer program product are provided for operating a primary and a backup RAID storage array. A disk drive configuration is loaded into a disk controller in a primary RAID array and a disk controller in a backup RAID array. The disk drive configuration includes a schedule for a sequence of selectively power cycling the disk drives, which is executed by the disk controller in the primary and in the backup RAID arrays. Upon detecting a disk failure, each disk controller executes a recovery procedure according to instructions included in the disk drive configuration. Recovery procedure includes suspending power cycling all disk drives and powering on all intentionally powered off disk drives. Data is copied from the (Continued)

corresponding backup RAID array disk drive to primary RAID array to rebuild the failed drive. The RAID configuration remains in this state until failed disk drive is repaired.

25 Claims, 5 Drawing Sheets

(56) References Cited

U.S. PATENT DOCUMENTS

| | | | |
|---|---|---|---|
| 8,707,076 B2 * | 4/2014 | Wenzel | G06F 11/1662 714/6.24 |
| 2006/0161805 A1 | 7/2006 | Tseng et al. | |
| 2009/0217067 A1 * | 8/2009 | Radhakrishnan | G06F 11/2074 713/320 |

OTHER PUBLICATIONS

Weddle, et al., "Paraid: A Gear Shifting Power-Aware RAID," 5th USENIX Conference on File and Storage Technologies (FAST 07) [article], Feb. 2007, pp. 245-260, Retrieved from the Internet: <URL: https://www.usenix.org/conference/fast-07/paraid-gear-shifting-power-aware-raid#:~: text=PARAID%20uses%20a% 20skewed%20striping,disks%20to%20the%20system%20load.>.

International Searching Authority, "Notification of Transmittal of the International Search Report and the Written Opinion of the International Searching Authority, or Declaration," Patent Cooperation Treaty Oct. 2, 2025, 15 pages, International Application No.-PCT/EP2025/065277.

* cited by examiner

SUSTAINABLE REDUNDANT ARRAY OF INEXPENSIVE DISKS (RAID)

BACKGROUND

The present invention relates generally to the field of computing, and more particularly to redundant array of inexpensive disks (RAID) storage technology.

RAID is a data storage virtualization technology where data is distributed across the drives in one of several ways, referred to as RAID levels, to provide a different balance among the key goals of reliability, availability, performance, and capacity. RAID levels greater than RAID 0 provide protection against unrecoverable sector read errors, as well as against failures of whole physical drives. Although RAID storage provides data protection in the event of disk failure, RAID storage consumes additional power to maintain the RAID arrays whether they are configured for mirror protection or parity protection. The lifespan of the disk drives in a continuously operating RAID topology is reduced and the likelihood for reuse is diminished.

It would be advantageous to extend the lifespan of all the disk drives within the RAID storage topology and to reduce power resources consumed by the RAID storage topology by selectively powering off disk drives in the RAID topology while maintaining the mirror protection and parity protection.

SUMMARY

Embodiments of the present invention disclose a computer-implemented method, computer system, and a computer program product for operating a RAID array and for recovering a RAID array. A disk drive configuration is received from a RAID storage program and loaded into a disk controller in a primary RAID array and a disk controller in a backup RAID array. The disk drive configuration implements a RAID level and a schedule for a sequence of selectively power cycling the disk drives. In response to detecting a failed disk drive in the primary RAID array or in the backup RAID array, the disk controller in the primary RAID array and the disk controller in the backup RAID array execute a recovery procedure. The recovery procedure includes powering on all the intentionally powered off disk drives in both the primary RAID array and the backup RAID array, discontinuing the power cycling, and rebuilding the failed disk drive using instructions from the RAID storage program to locate the needed data.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
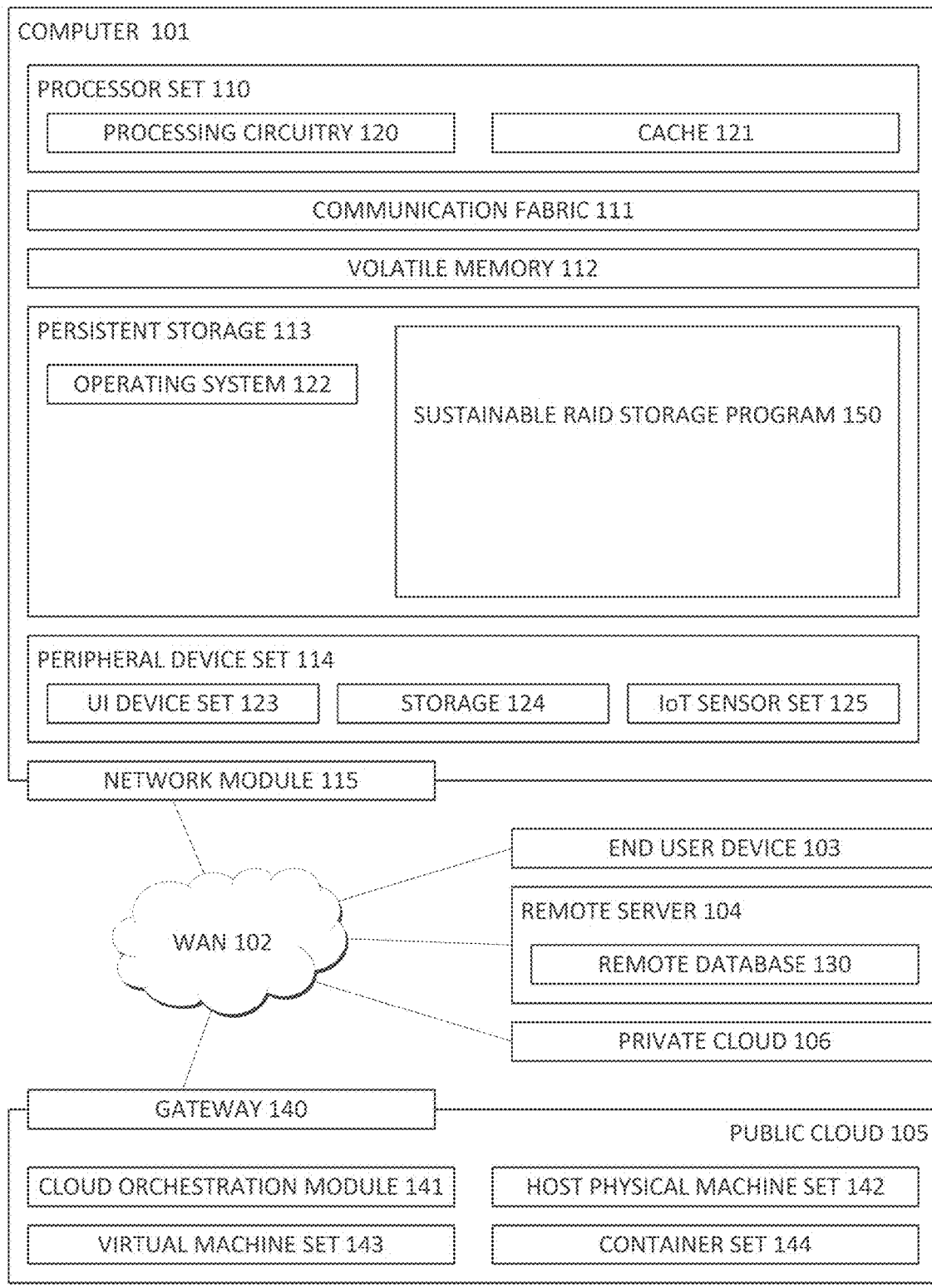
FIG. 1 illustrates a networked computing environment according to at least one embodiment.

The following described exemplary embodiments provide a computer system, computer-implemented method, and computer program product for sustainable RAID storage.

RAID-1 is configured to ensure an exact mirrored copy of the data is maintained. In RAID-1 if one disk drive fails, the second mirrored disk drive responds to data requests, and the failed disk drive is manually replaced. A RAID-5 configuration uses a combination of parity and striping instead of mirroring to provide data redundancy. With striping, consecutive segments of data are stored across different storage devices. The computer system, which is the operating system (OS), disk subsystem software, hardware firmware, or a combination thereof, calculates parity and writes the parity along with the data. RAID-5 rebuilds a failed disk drive using the parity data from the remaining disk drives. Similar to RAID-5, RAID-6 provides data redundancy through striping and parity but uses double parity to enable recovery of two failed disk drives.

As such, the present embodiment has the capacity to improve the technical field of RAID storage and to reduce power resources consumed by the RAID storage topology by combining parity protection (RAID-5 or RAID-6) and mirroring (RAID-1) to recover all data during operation. This enables selectively powering off drives in the RAID storage topology, either synchronously or asynchronously, which reduces power consumption while maintaining data integrity. The overall lifespan of the disk drives in the RAID topology is extended since some disk drives can be selectively powered off and placed in standby mode.

It would be advantageous to reduce power consumption, and to extend the lifespan of all the disk drives within the RAID storage topology by selectively powering off disk drives in the RAID topology while maintaining the mirror protection and parity protection.

According to an aspect of the invention, there is provided a computer-implemented method of operating a primary and a backup RAID storage array. A disk controller in a primary RAID array and a disk controller in a backup RAID array load a disk drive configuration that is received from a RAID storage program that resides in the disk controllers. The disk drive configuration comprises a RAID level and implements a schedule for a sequence of selectively power cycling the disk drives. The disk drive configuration is executed by the disk controllers, and upon detecting a failure in a disk drive, a configured recovery procedure is executed. This aspect may advantageously extend the lifespan of the disk drives in the arrays by selectively powering off disk drives while maintaining the mirror protection and parity protection.

According to another aspect of the invention, there is provided a computer-implemented method to execute the disk drive configuration to powers off one or more disk drives in the RAID arrays for a configurable amount of time. This aspect may advantageously extend the lifespan of the disk drives in the arrays.

According to another aspect of the invention, there is provided a computer-implemented method to pause the scheduled power cycling for a configurable amount of time during which all disk drives are powered on. This aspect advantageously provides a time period during which the disk drives perform data synchronization as needed.

According to another aspect of the invention, there is provided instructions from the RAID storage program to power cycle the disk drives asynchronously or synchronously relative to the computer operating system, based on a configurable setting. This aspect may advantageously improve performance and throughput.

According to another aspect of the invention, there is a computer-implemented method to combine parity protection and disk drive mirroring to perform recovery. This aspect may advantageously improve protection of the data on the disk drives.

According to another aspect of the invention, there is provided a computer system for operating a primary and a backup RAID storage array. The computer system provides one or more processors, a memory coupled to at least one of the processors, and a set of computer program instructions stored in the memory and executed by at least one of the processors to perform the actions of loading a disk drive configuration that a disk controller in a primary RAID array and a disk controller in a backup RAID array load a disk drive configuration that is received from a RAID storage program that resides in the disk controllers. The disk drive configuration comprises a RAID level and a schedule for a sequence of selectively power cycling the disk drives. The disk drive configuration is executed by the RAID storage program in the disk controllers, and upon detecting a failure in a disk drive, a configured recovery procedure is executed. This aspect may advantageously enable a computer system to extend the lifespan of the disk drives in the arrays by selectively powering off disk drives while maintaining the mirror protection and parity protection.

According to another aspect of the invention, there is provided a computer program product for operating a primary and a backup RAID storage array. The computer program product provides a non-transitory tangible storage device having program code embodied on the non-transitory tangible storage device, and the program code being executable by a processor of a computer to perform a computer-implemented method of loading a disk drive configuration that a disk controller in a primary RAID array and a disk controller in a backup RAID array load a disk drive configuration that is received from a RAID storage program that resides in the disk controllers. The disk drive configuration comprises a RAID level and implements a schedule for a sequence of selectively power cycling the disk drives. The disk drive configuration is executed by the disk controllers, and upon detecting a failure in a disk drive, a configured recovery procedure is executed. This aspect may advantageously enable a computer system executing the computer program code to extend the lifespan of the disk drives in the arrays by selectively powering off disk drives while maintaining the mirror protection and parity protection.

According to another aspect of the invention, there is provided a computer-implemented method for recovering a failed disk drive. A disk controller in a primary RAID array and a disk controller in a backup RAID array load a disk drive configuration that is received from a RAID storage program that resides in the disk controllers. A mapping of data located on all the disk drives, and a disk drive availability status, is maintained in a disk controller in a primary RAID array and in a disk controller in a backup RAID array. Subsequent input/output operations are serviced using the backup RAID array while a recovery procedure executes. The power cycling of all the disk drives is discontinued. All the intentionally powered off disk drives in both the primary RAID array and the backup RAID array. Based on the disk drive on the backup RAID array that corresponds to the failed disk drive on the primary RAID array being available, the failed disk drive is rebuilt using the disk drive on the backup RAID array along with data from any other required disk drive on the primary RAID array. This aspect may advantageously enable a computer system to respond to a disk drive failure while extending the lifespan of the disk drives in the arrays by selectively powering off disk drives.

The computer system provides one or more processors, a memory coupled to at least one of the processors, and a set of computer program instructions stored in the memory and executed by at least one of the processors to perform the actions of loading a disk drive configuration that a disk controller in a primary RAID array and a disk controller in a backup RAID array load a disk drive configuration that is received from a RAID storage program that resides in the disk controllers. The disk drive configuration implements a schedule for a sequence of selectively power cycling the disk drives. The disk drive configuration is executed by the disk controllers, and upon detecting a failure in a disk drive, a configured recovery procedure is executed. This aspect may advantageously enable a computer system to extend the lifespan of the disk drives in the arrays by selectively powering off disk drives while maintaining the mirror protection and parity protection.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring to FIG. 1, a computing environment 100 according to at least one embodiment is depicted. Computing environment 100 contains an example of an environment for the execution of at least some of the computer code involved in performing the inventive methods, such as sustainable RAID storage program (program) 150. In addition to the program 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and the program 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144. Furthermore, despite only being depicted in computer 101, the program 150 may be stored in and/or executed by, individually or in any combination, EUD 103, remote server 104, public cloud 105, and private cloud 106.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, for illustrative brevity. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The program 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth® (Bluetooth and all Bluetooth-based trademarks and logos are trademarks or registered trademarks of Bluetooth SIG, Inc. and/or its affiliates) connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to the present embodiment, a user using any combination of an EUD 103, remote server 104, public cloud 105, and private cloud 106 may use the program 150 to generate a custom remark prediction model (e.g., a machine learning model) for each user/meeting participant, to predict and block objectionable remarks from the meeting participant before the objectionable remarks are delivered to the other meeting participants. Embodiments of the present disclosure are explained in more detail below with respect to FIGS. 2 to 5.

Figure 2:
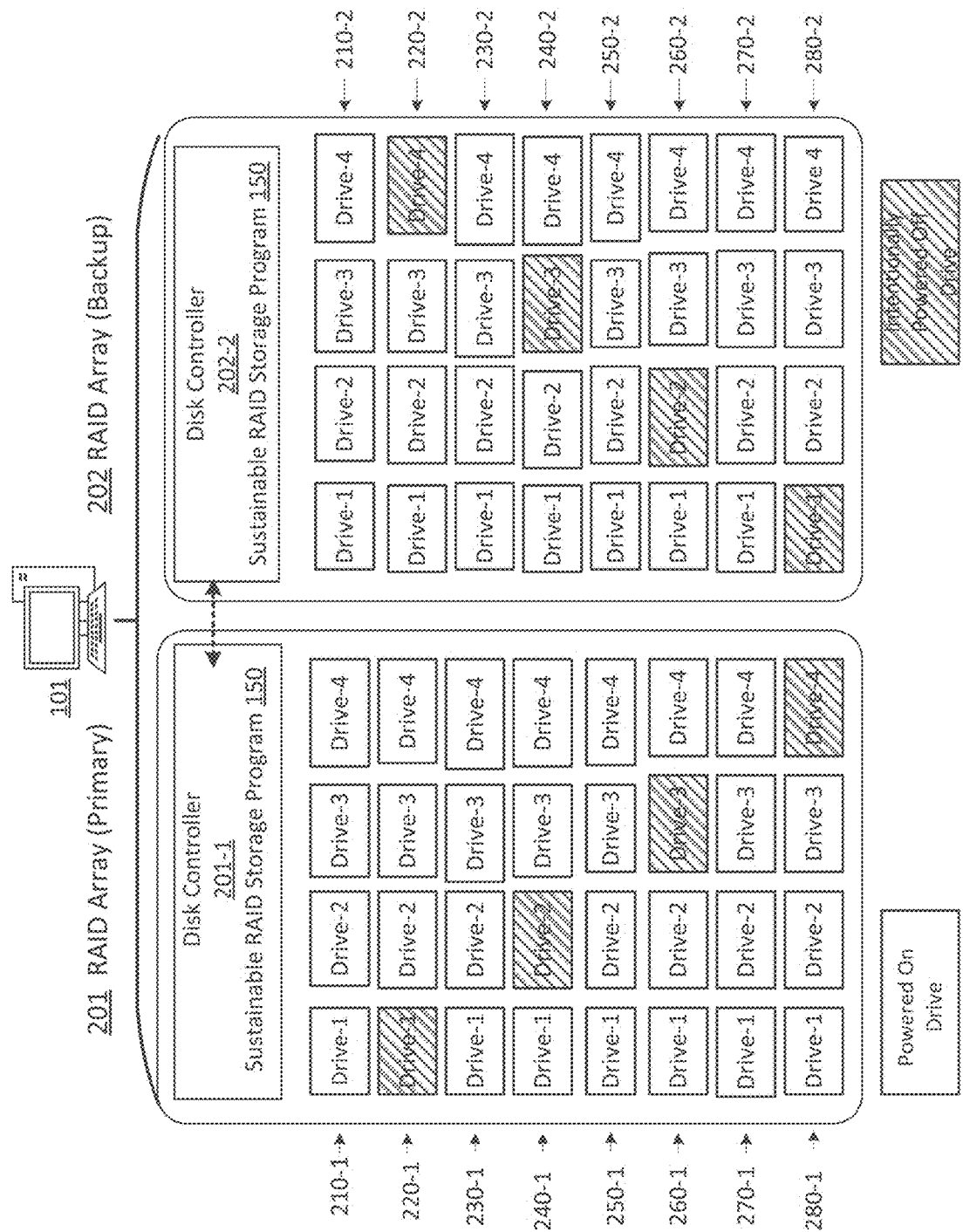
FIG. 2 is a schematic block diagram of a RAID storage topology in normal operation according to at least one embodiment.

FIG. 2 is a schematic block diagram of a RAID storage topology in normal operation according to at least one embodiment.

The storage 124 of peripheral device set 114 (FIG. 1) includes one or more exemplary RAID arrays, such as RAID array 201 and RAID array 202.

The RAID data storage virtualization technology combines multiple physical disk drives into one or more logical units to provide data redundancy, improved performance, or both. The RAID disk drives are typically housed in an enclosure that is either installed within the computer 101, or that may be housed in one or more enclosures (cabinets) that are separate from the computer 101. The number of physical disk drives that comprise a RAID array can vary, depending on the desired storage capacity, manufacturer, and model among other factors.

In FIG. 2, each of the array enclosures, RAID array 201 (primary) and RAID array 202 (backup) include eight rows, each having four disk drives, drive-1 ... drive-4. Each of the array enclosures also includes a disk controller (disk controller 201-1 and disk controller 202-2). The disk controllers include circuitry that are bidirectional paths between the disk drives and the hardware bus connecting the array to the computer 101. All or a portion of the instructions that implement the program 150 may be stored in volatile or non-volatile memory in the disk controllers for execution, such as to respond to OS and end user application program instructions. In addition to being executed in the disk controllers, other portions of the program 150 may be executed in the OS or as an agent in an end user application. For example, new or modified input/output (I/O) instructions can be added to the OS to control the administration of the RAID arrays and their respective disk drives. Optimally, the administration function is enabled in the UI device set 123, through which the program 150 receives instructions to configure the RAID arrays and to respond to queries by displaying RAID array status and other information. Administration includes powering on/off, configuring the behavior of the drives for redundancy, and responding to failed disk drives and other hardware in the arrays. Program instructions that can be inserted into end user application programs include I/O instructions, for example, those to read, update, and insert data according to the purpose of the application program logic.

FIG. 2 describes an example configuration where RAID-1 and RAID-5 are used in combination in normal operation, and without failed drives. The configuration of the RAID arrays reflects the business requirements of the enterprise. A full backup set of disk drives is maintained (RAID-1), here shown as RAID array 202. In FIG. 2, when one disk drive from a row of disk drives in the RAID array 201 is intentionally powered off, a disk drive in the corresponding row in RAID array 202 is also intentionally powered off, such that a RAID-5 backup configuration is used to maintain access to all the data. Although a disk drive is powered off in both the RAID array 201 and RAID array 202, instructions from the program 150 cause the arrays to treat the powered off disk drive as if it were powered on. This is because the program 150 maintains awareness, for example, a mapping, between the disk controllers, not only of disk drive status, but also of data location. Therefore, each disk controller uses its cache to maintain data availability, writing data to the next configured disk drive.

Since the disk drive that is powered off executes fewer data transfer operations, the overall lifespan of the disk drive is extended. For example, in FIG. 2 there are four disk drives in each row. If each disk drive is configured to be powered off 25% because it is one of four disk drives in the row, then that disk drive performs 25% fewer read/write movements. In simple exemplary numbers, a disk drive is certified for a lifetime of "10,000" number of access operations. If that disk drive normally performs "1000" access operations in an hour, powering off the disk drive for one hour potentially extends the lifetime of the disk drive by 10%. These are merely examples and results depend on several factors, including how active the disk drive is. In some embodiments, the disk drive can be configured into a standby mode which still consumes more power than a powered off disk drive, but less so than a fully powered on disk drive.

In addition to defining which disk drives are intentionally powered off and in what sequence, the configuration specifies a schedule by which the powering off occurs. Each disk drive is powered off for a specific configurable time-n, such as one week or one month. The configuration also specifies a configurable time-x, for example twenty-four hours, during which all drives are temporarily powered on. Having all the disk drives powered on permits the program 150 to instruct the newly powered on disk drives to rebuild, recover, and synchronize data, as needed, using data from the other disk drives.

Figure 3:
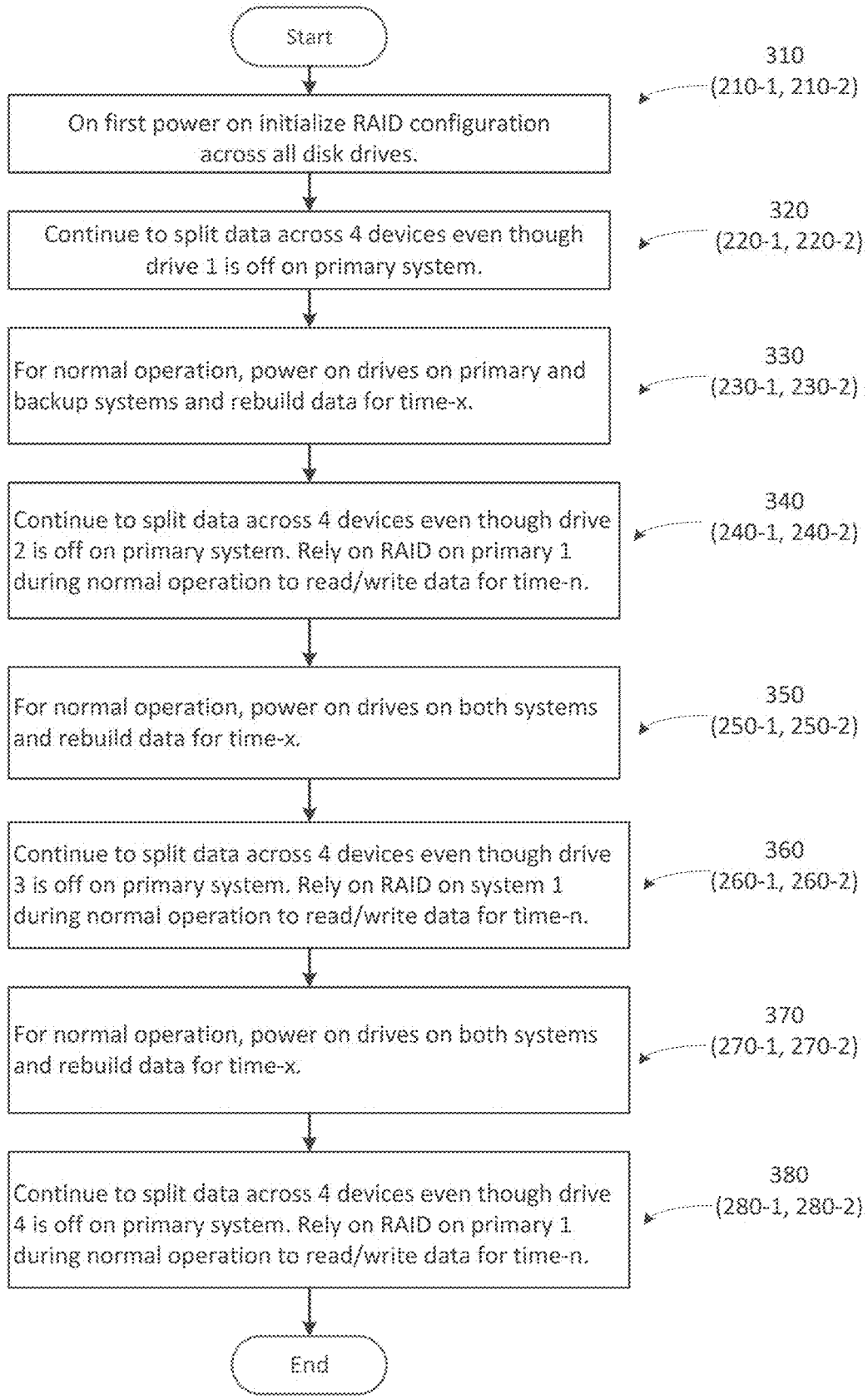
FIG. 3 is an operational flowchart illustrating sustainable RAID storage according to at least one embodiment.

FIG. 3 is an operational flowchart illustrating sustainable RAID storage according to at least one embodiment.

At 310, the disk controllers 201-1 and 202-1 receive instructions from the program 150 to initialize and configure the primary RAID array 201 and the backup RAID array 202. In the initial configuration shown in FIG. 2, in RAID array 201 disk drive-1 in row 220-1, disk drive-2 in row 240-1, disk drive-3 in row 260-1, and disk drive-4 in row 280-1 are powered off for time-n. Similarly, in RAID array 202, disk drive-4 in row 220-2, disk drive-3 in row 240-2, disk drive-2 in row 260-2, and disk drive-1 in row 280-2 are powered off for time-n.

At 320 in row 220-1, data is distributed across all four drives, even though disk drive-1 in that row is powered off. The program 150 ensures that the data continues to be striped across the remaining disk drives in row 220-1, so that all data is preserved. During this time-n, during normal operation the primary RAID array 201 satisfies all I/O requests. At the expiration of time-n, the program 150 resets the timer in anticipation of the next powering on/off cycle.

At 330 row 230-1 and row 230-2 represents the period time-x where all disk drives in both RAID array 201 and RAID array 202 are powered on. During time-x the program 150 sends instructions to the disk controllers 201-1 and 202-1 to recover, rebuild, and synchronize data on all the disk drives such that both RAID array 201 and RAID array 202 have a consistent view of the data. At the end of time-x the program 150 resets the timer that is tracking this powering on cycle in anticipation of the next powering on cycle.

At 340, the disk controllers 201-1 and 202-1 receive instructions from the program 150 to continue to power cycle the next set of disk drives, disk drive-2 in row 240-1 of RAID array 201 and disk drive-3 in row 240-2 of RAID array 2. Data is distributed across all four drives, even though disk drive-2 and disk drive-3 in rows 240-1 and 240-2, respectively, are powered off. As in 320 above, during normal operation, during this time-n, the primary RAID array 201 satisfies all I/O requests. At the expiration of time-n, the program 150 resets the timer in anticipation of the next powering on/off cycle.

At 350, row 250-1 and row 250-2 represents the period time-x where, again, all disk drives in both RAID array 201 and RAID array 202 are powered on. During time-x the program 150 sends instructions to the disk controllers 201-1 and 202-1 to recover, rebuild, and synchronize data on all the disk drives such that both RAID array 201 and RAID array 202 have a consistent view of the data. At the end of this time-x the program 150 resets the timer that is tracking this powering on cycle in anticipation of the next powering on cycle.

At 360, the disk controllers 201-1 and 202-1 receive instructions from the program 150 to continue to power cycle the next set of disk drives, disk drive-3 in RAID array 201 row 240-1 and disk drive-2 in RAID array 2 row 240-2. Data is distributed across all four drives, even though disk drive-3 and disk drive-2 in rows 240-1 and 240-2, respectively, are powered off. As in 320 above, during normal operation, during this time-n, the primary RAID array 201 satisfies all data requests. At the expiration of time-n, the program 150 resets the timer in anticipation of the next powering on/off cycle.

At 370, row 270-1 and row 270-2 represents the period time-x where, again, all disk drives in both RAID array 201 and RAID array 202 are powered on. During time-x the program 150 sends instructions to the disk controllers 201-1 and 202-1 to recover and rebuild data on all the disk drives such that both RAID array 201 and RAID array 202 have a consistent view of the data. At the end of this time-x the program 150 resets the timer that is tracking this powering on cycle in anticipation of the next powering on cycle.

At 380, the disk controllers 201-1 and 202-1 receive instructions from the program 150 to continue to power cycle the next set of disk drives, disk drive-4 in RAID array 201 row 280-1 and disk drive-1 in RAID array 2 row 280-2. Data is distributed across all four drives, even though disk drive-4 and disk-drive-1 in rows 240-1 and 240-2, respectively, are powered off. As in 320 and 360 above, during normal operation, during this time-n, the primary RAID array 201 satisfies all data requests. At the expiration of time-n, the program 150 resets the timer in anticipation of the next powering on/off cycle.

Program 150 continues to issue the necessary instructions to the disk controllers 201-1 and 202-1 to execute the power cycling of the disk drives and the associated I/O operations, according to the configuration specifications. This cycling continues until, as shown in FIG. 4, a disk drive failure occurs.

Figure 4:
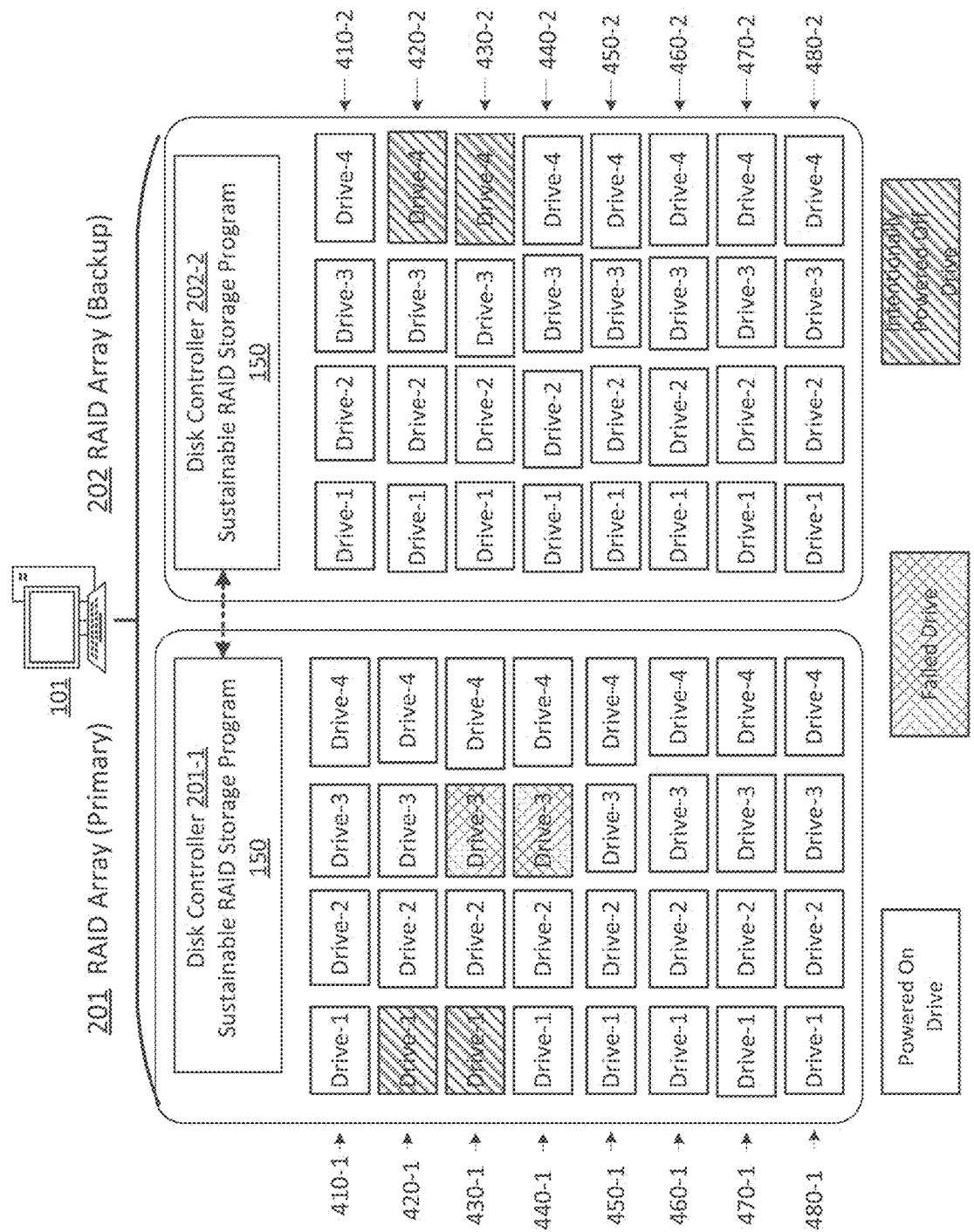
FIG. 4 is a schematic block diagram of a RAID storage topology in a failed state according to at least one embodiment.

FIG. 4 is a schematic block diagram of the example RAID topology as that in FIG. 2, but illustrates a failed state is detected on a disk drive during the course of operation.

Figure 5:
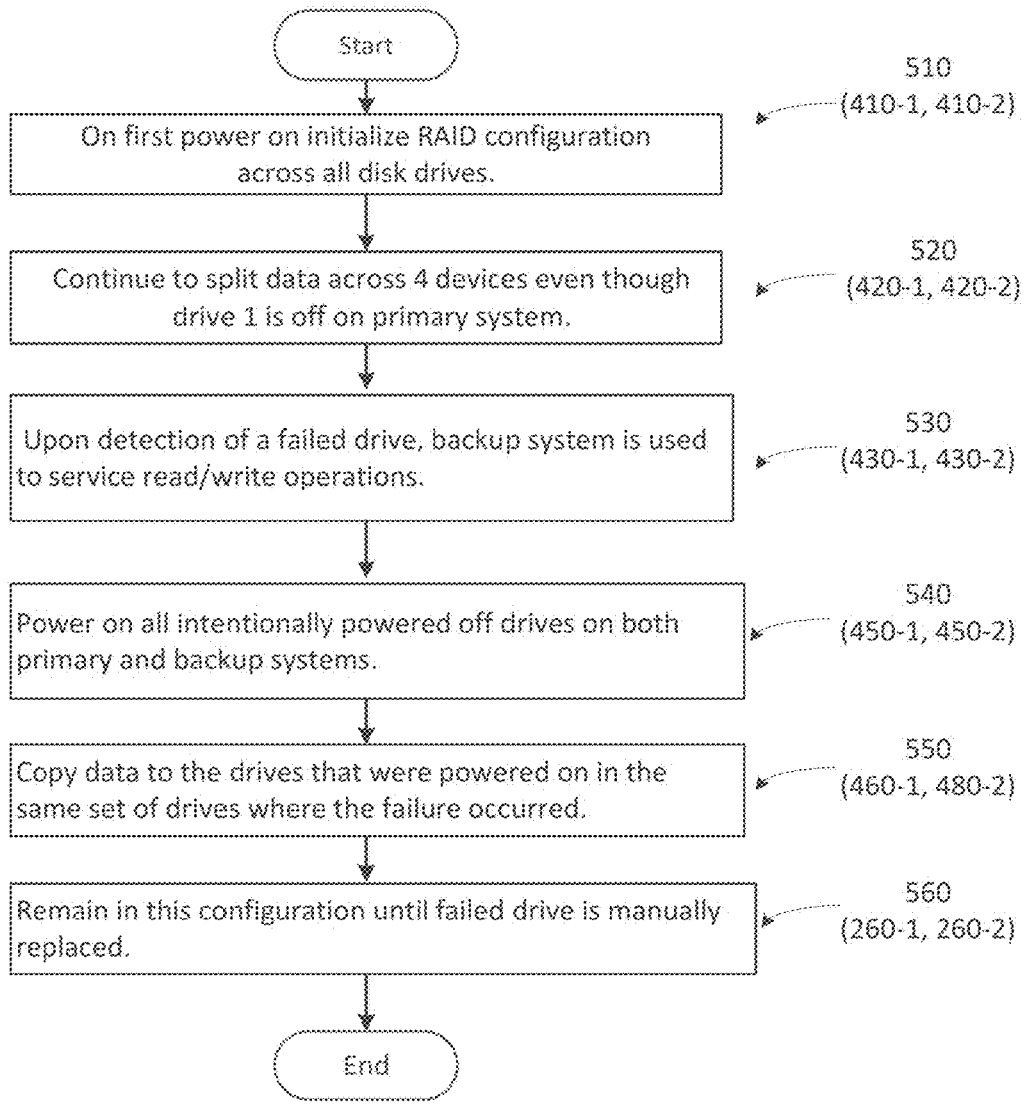
FIG. 5 is an operational flowchart illustrating recovery of a sustainable RAID storage according to at least one embodiment.

In FIGS. 5, at 510 and 520 the disk controllers 201-1 and 202-1 receive instructions from the program 150 to initialize and configure the primary RAID array 201 and the backup RAID array 202. FIG. 5 assumes that some number of power cycling of the disk drives, as in FIG. 3, has already occurred. In the current state of the configuration, RAID array 201 disk drive-1 in row 220-1, disk drive-2 in row 240-1, disk drive-3 in row 260-1, and disk drive-4 in row 280-1 are powered off for time-n.

At 530, upon recognizing a disk failure (disk drive-3 in row 430-1 and disk drive-3 in row 440-1), the disk controllers 201-1 and 202-2 receive instructions from program 150 on the disk controller 201-1 to service subsequent I/O operations using the backup RAID array 202 while recovery occurs.

At 540, the program 150 sends instructions to the disk controllers 201-1 and 202-2 to power on the intentionally powered off disk drives in both the primary RAID array 201 and the backup RAID array 202 in preparation for a recovery operation.

Because two of the disks are unavailable the primary array, RAID array 201, in row 430-1 (one powered off and one failed), parity (n-1 disk drives) can no longer be used to rebuild the failed disk drive on row 430-1. Therefore, the program 150 instructs the disk controller 201-1 on which disk to locate the data needed to rebuild the failed disk drive. In this example, if the corresponding disk drives (430-2 disk drive-1, 430-2 disk drive-3) are available, the program 150 instructs the disk controllers 201-1 and 202-2 to power on the 430-1 disk drive-1, and copy the data from the corresponding disk drive, 430-2 disk drive-3 to rebuild the failed disk drive 430-1 disk drive-3 on the primary RAID array 201. This rebuilding is possible since the program 150 on the RAID array 201 now has access to all the data needed to rebuild the array.

However, if 430-2 disk drive-3 is powered off, then the program 150 instructs the disk controllers 201-1 and 202-2 to power on 430-2 disk drive-4, and copy the data needed to rebuild the disk drives in row 430-1 from row 430-1 to row 430-2 on the RAID array 202.

At 550, the program 150 sends instructions to the disk controllers 201-1 and 202-2 to copy data to the disk drives that were powered on in the same row where the failed disk drive is detected, here, rows 430-1 and 440-1. It may occur that a failed drive in the primary RAID array 201 is the same disk drive that is powered off in the backup RAID array 202. In that case, the RAID recovery feature that is part of the RAID hardware will rebuild the data.

At 560, the RAID array 201 and the RAID array 202 remain in this configuration until the failed drive(s) is replaced.

It may be appreciated that FIGS. 2 to 5 provide only an illustration of one embodiment and do not imply any limitations regarding how different embodiments may be implemented. Many modifications to the depicted embodiment(s) may be made based on design and implementation requirements.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of operating a primary and a backup RAID storage array, the computer-implemented method comprising:

loading into a disk controller in a primary RAID array and a disk controller in a backup RAID array a disk drive configuration received from a RAID storage program, wherein the disk drive configuration comprises a RAID level and a schedule for a sequence of selectively power cycling the disk drives;

executing the disk drive configuration by the disk controller in the primary RAID array and the disk controller in the backup RAID array;

in response to detecting a failed disk drive in the primary RAID array or in the backup RAID array, discontinuing the power cycling of the disk drives;

executing a recovery procedure according to the disk drive configuration, wherein the recovery procedure includes powering on all intentionally powered off disk drives; and rebuilding the failed disk drive using instructions from the RAID storage program to locate the needed data.

2. The computer-implemented method of claim 1, wherein the disk drive configuration specifies one or more disk drives to power off in the primary RAID array and in the backup RAID array and for a specific configurable amount of time, and wherein for each of the one or more disk drives to power off in the primary RAID array a corresponding disk drive to power off in the backup RAID array is not required.

3. The computer-implemented method of claim 1, wherein the power cycling the disk drives schedule is temporarily paused for a configurable amount of time during which all the disk drives are powered on, and during which the disk drives perform data synchronization as needed.

4. The computer-implemented method of claim 1, wherein the disk drive configuration specifies one or more disk drives to power off in the primary RAID array and in the backup RAID array and for a specific configurable amount of time.

5. The computer-implemented method of claim 1, wherein the RAID storage program issues instructions to cause power cycling the disk drives asynchronously or synchronously relative to the computer operating system based on a configurable setting.

6. The computer-implemented method of claim 1, wherein parity protection and disk drive mirroring are combined to perform data recovery.

7. The computer-implemented method of claim 1, wherein a one-to-one correspondence between a state of each disk drive in the primary RAID array and the state of a corresponding disk drive in the backup RAID array is not required.

8. A computer system for operating a primary and a backup RAID storage array, the computer system comprising:

one or more processors;

a memory coupled to at least one of the processors;

a set of computer program instructions stored in the memory and executed by at least one of the processors to perform actions of:

receiving from a RAID storage program, by a disk controller in a primary RAID array and a disk controller in a backup RAID array, a disk drive configuration, wherein the disk drive configuration comprises a RAID level and a schedule for a sequence of selectively power cycling the disk drives;

executing the disk drive configuration by the disk controller in the primary RAID array and the disk controller in the backup RAID array;

in response to detecting a failed disk drive in the primary RAID array or in the backup RAID array, discontinuing the power cycling of the disk drives;

executing a recovery procedure according to the disk drive configuration, wherein the recovery procedure includes powering on all intentionally powered off disk drives; and rebuilding the failed disk drive using instructions from the RAID storage program to locate the needed data.

9. The computer system of claim 8, wherein the disk drive configuration specifies one or more disk drives to power off in the primary RAID array and in the backup RAID array and for a specific configurable amount of time, and wherein for each of the one or more disk drives to power off in the primary RAID array a corresponding disk drive to power off in the backup RAID array is not required.

10. The computer system of claim 8, wherein the power cycling the disk drives schedule is temporarily paused for a configurable amount of time during which all the disk drives are powered on, and during which the disk drives perform data synchronization as needed.

11. The computer system of claim 8, wherein the disk drive configuration specifies one or more disk drives to power off in the primary RAID array and in the backup RAID array and for a specific configurable amount of time.

12. The computer system of claim 8, wherein the RAID storage program issues instructions to cause power cycling the disk drives asynchronously or synchronously relative to the computer operating system based on a configurable setting.

13. The computer system of claim 8, wherein parity protection and mirroring are combined to perform data recovery.

14. The computer system of claim 8, wherein a one-to-one correspondence between a state of each disk drive in the primary RAID array and the state of a corresponding disk drive in the backup RAID array is not required.

15. A computer program product for recovering a primary and a backup RAID storage array, the computer program product comprising a non-transitory tangible storage device having program code embodied therewith, the program code executable by a processor of a computer to perform a method, the method comprising:

receiving from a RAID storage program, by a disk controller in a primary RAID array and a disk controller in a backup RAID array, a disk drive configuration, wherein the disk drive configuration comprises a RAID level and a schedule for a sequence of selectively power cycling the disk drives;

executing the disk drive configuration by the disk controller in the primary RAID array and the disk controller in the backup RAID array;

in response to detecting a failed disk drive in the primary RAID array or in the backup RAID array, discontinuing the power cycling of the disk drives;

executing a recovery procedure according to the disk drive configuration, wherein the recovery procedure includes powering on all intentionally powered off disk drives; and rebuilding the failed disk drive using instructions from the RAID storage program to locate the needed data.

16. The computer program product of claim 15, wherein the recovery procedure further comprises:

powering on all the intentionally powered off disk drives in both the primary RAID array and the backup RAID array.

17. The computer program product of claim 15, wherein the disk drive configuration specifies one or more disk drives to power off in the primary RAID array and in the backup RAID array and for a specific configurable amount of time.

18. The computer program product of claim 15 wherein the power cycling the disk drives is temporarily paused for a configurable amount of time during which all the disk drives are powered on, and during which the disk drives perform data synchronization as needed.

19. The computer program product of claim 15, wherein a one-to-one correspondence between a state of each disk drive in the primary RAID array and the state of a corresponding disk drive in the backup RAID array is not required.

20. The computer program product of claim 15, wherein the RAID storage program issues instructions to cause power cycling the disk drives asynchronously or synchronously relative to the operating system, based on a configurable setting.

21. The computer program product of claim 15, wherein parity protection and mirroring are combined to perform data recovery.

22. A computer-implemented method for recovery of a failed disk drive, wherein the computer-implemented method comprises:
   maintaining in a disk controller in a primary RAID array and in a disk controller in a backup RAID array a mapping of data located on all the disk drives, and a disk drive availability status;
   servicing subsequent input/output operations using the backup RAID array while a recovery procedure executes;
   powering on all intentionally powered off disk drives in both the primary RAID array and the backup RAID array;
   based on the disk drive on the backup RAID array that corresponds to the failed disk drive on the primary RAID array being available, rebuild the failed disk drive using the disk drive on the backup RAID array along with data from any other required disk drives on the primary RAID array; and
   discontinuing the power cycling of all the disk drives.

23. The computer-implemented method of claim 22, wherein a one-to-one correspondence between a state of each disk drive in the primary RAID array and the state of a corresponding disk drive in the backup RAID array is not required.

24. A computer program product for recovery of a failed disk drive, the computer program product comprising a non-transitory tangible storage device having program code embodied therewith, the program code executable by a processor of a computer to perform a method, the method comprising:
   maintaining in a disk controller in a primary RAID array and in a disk controller in a backup RAID array a mapping of data located on all the disk drives, and a disk drive availability status;
   servicing subsequent input/output operations using the backup RAID array while a recovery procedure executes;
   discontinuing the power cycling of all the disk drives;
   powering on all intentionally powered off disk drives in both the primary RAID array and the backup RAID array;
   based on the disk drive on the backup RAID array that corresponds to the failed disk drive on the primary RAID array being available, rebuild the failed disk drive using the disk drive on the backup RAID array along with data from any other required disk drives on the primary RAID array.

25. The computer program product of claim 24, wherein based on the disk drive on the backup RAID array that corresponds to the failed disk drive on the primary RAID array not being available, instructing, by a RAID storage program to the backup RAID array and the primary RAID array, which disk drives to access to rebuild the failed and/or unavailable disk drives, wherein rebuilding all the backup RAID array is performed as needed.

\* \* \* \* \*